(12) United States Patent
Lim et al.

(10) Patent No.: US 11,197,553 B2
(45) Date of Patent: Dec. 14, 2021

(54) WEARABLE CHAIR

(71) Applicants: Hyundai Motor Company, Seoul (KR); Kia Motors Corporation, Seoul (KR)

(72) Inventors: Hyun Seop Lim, Gyeonggi-do (KR); Dong Jin Hyun, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 2 days.

(21) Appl. No.: 16/694,558

(22) Filed: Nov. 25, 2019

(65) Prior Publication Data

US 2020/0315358 A1 Oct. 8, 2020

(30) Foreign Application Priority Data

Apr. 4, 2019 (KR) .................. 10-2019-0039680

(51) Int. Cl.
*A47C 9/10* (2006.01)
*B25J 9/00* (2006.01)
*A47C 9/02* (2006.01)

(52) U.S. Cl.
CPC .............. *A47C 9/10* (2013.01); *A47C 9/025* (2013.01); *B25J 9/0006* (2013.01)

(58) Field of Classification Search
CPC ............ B65J 9/0006; A61H 2201/165; A61H 2201/024; A61H 2201/0244; A61H 3002/005; A61H 3002/007; A61G 5/14; A47C 9/10; A47C 9/025; A61F 5/0102; A61F 2005/0146; A61F 2005/016; A61F 2005/0162; A61F 2005/0165; A61F 2005/0172

USPC ................................ 297/4, DIG. 10; 602/16
See application file for complete search history.

(56) References Cited

U.S. PATENT DOCUMENTS

| | | | | |
|---|---|---|---|---|
| 4,095,842 A | * | 6/1978 | Tretick | A47C 9/027 297/344.12 |
| D249,987 S | * | 10/1978 | Bonner | D6/365 |
| 4,138,156 A | * | 2/1979 | Bonner | A47C 9/10 297/4 |
| 4,456,003 A | * | 6/1984 | Allard | A61F 5/0102 602/16 |

(Continued)

FOREIGN PATENT DOCUMENTS

| | | | | |
|---|---|---|---|---|
| EP | 16197787 | * | 9/2018 | .............. A61H 3/00 |
| KR | 101755806 B1 | | 7/2017 | |

*Primary Examiner* — Kyle J. Walraed-Sullivan
(74) *Attorney, Agent, or Firm* — Mintz Levin Cohn Ferris Glovsky and Popeo, P.C.; Peter F. Corless

(57) ABSTRACT

A wearable chair includes: a thigh link extending in an extension direction of a wearer's thigh to be connected to the wearer's thigh; a crus link extending in an extension direction of the wearer's crus to be connected to the wearer's crus, having an upper end portion rotatably coupled to a lower end portion of the thigh link, and prevented from rotating such that an angle between the crus link and the thigh link is less than a sitting angle; and a contact link having a first end rotatably coupled to a lower end portion of the crus link and a second end coming in contact with the ground at a predetermined position from the crus link by rotating with respect to the first end with relative rotation between the thigh link and the crus link when the wearer is in a sitting position.

12 Claims, 14 Drawing Sheets

(56) References Cited

U.S. PATENT DOCUMENTS

| | | | | |
|---|---|---|---|---|
| 4,732,143 A * | 3/1988 | Kausek | A61F 5/0123 | 602/16 |
| 4,817,588 A * | 4/1989 | Bledsoe | A61F 5/0125 | 602/16 |
| 4,867,273 A * | 9/1989 | Schaevitz | A47C 9/025 | 182/116 |
| 5,188,584 A * | 2/1993 | Petrofsky | A61F 5/0102 | 602/16 |
| 6,203,511 B1 * | 3/2001 | Johnson | A61F 5/0125 | 602/16 |
| 6,347,406 B1 * | 2/2002 | Jones | A45F 4/02 | 2/69 |
| 6,361,513 B1 * | 3/2002 | Rossi | A61F 5/0193 | 602/16 |
| 6,402,713 B1 * | 6/2002 | Doyle | A61F 5/0123 | 602/16 |
| 6,960,175 B1 * | 11/2005 | Myers | A61F 5/0125 | 602/16 |
| 7,235,059 B2 * | 6/2007 | Mason | A61F 5/0125 | 128/882 |
| 7,410,471 B1 * | 8/2008 | Campbell | A61B 5/6829 | 602/16 |
| 2003/0151288 A1 * | 8/2003 | Deisig | A47C 3/20 | 297/313 |
| 2008/0009778 A1 * | 1/2008 | Hiki | A61F 5/0102 | 602/16 |
| 2008/0097269 A1 * | 4/2008 | Weinberg | A61F 2/70 | 602/16 |
| 2009/0312844 A1 * | 12/2009 | Ikeuchi | A61H 3/008 | 623/40 |
| 2010/0210980 A1 * | 8/2010 | Kudoh | A61H 3/00 | 601/34 |
| 2011/0224586 A1 * | 9/2011 | Ikeuchi | A61H 3/008 | 601/35 |
| 2011/0251534 A1 * | 10/2011 | Matsuoka | A61H 3/00 | 601/35 |
| 2011/0257567 A1 * | 10/2011 | Ikeuchi | A61H 3/00 | 601/35 |
| 2013/0102934 A1 * | 4/2013 | Ikeuchi | A61H 1/0244 | 601/35 |
| 2015/0141888 A1 * | 5/2015 | Chiang | A61F 5/0123 | 602/16 |
| 2016/0135604 A1 * | 5/2016 | Kim | A47C 4/04 | 297/4 |
| 2017/0008164 A1 * | 1/2017 | Lee | A61H 1/02 | |
| 2017/0105530 A1 * | 4/2017 | Sheinkop | A47C 9/025 | |
| 2017/0360644 A1 * | 12/2017 | Hyun | A43B 3/0005 | |
| 2017/0360646 A1 * | 12/2017 | Poli | A61H 1/0255 | |
| 2018/0066740 A1 * | 3/2018 | Lee | F16H 3/006 | |
| 2018/0296380 A1 * | 10/2018 | Wang | A61F 5/0125 | |
| 2018/0338836 A1 * | 11/2018 | Fujisawa | B25J 9/0006 | |
| 2019/0133805 A1 * | 5/2019 | Gunura | A61F 5/0125 | |
| 2020/0008583 A1 * | 1/2020 | Gunura | A47C 9/10 | |
| 2020/0046124 A1 * | 2/2020 | Park | A47C 7/002 | |
| 2020/0046132 A1 * | 2/2020 | Gunura | A61H 3/00 | |
| 2020/0061803 A1 * | 2/2020 | Wang | A61H 1/0237 | |
| 2020/0129367 A1 * | 4/2020 | Lee | A61H 1/024 | |
| 2020/0155390 A1 * | 5/2020 | Bae | A47C 9/025 | |
| 2020/0206900 A1 * | 7/2020 | Lee | A47C 7/002 | |
| 2020/0268584 A1 * | 8/2020 | Hsieh | A61H 1/00 | |
| 2020/0289034 A1 * | 9/2020 | Yoshikawa | A61B 5/6828 | |
| 2020/0315356 A1 * | 10/2020 | Newara | A47C 7/60 | |
| 2020/0315358 A1 * | 10/2020 | Lim | A47C 9/10 | |
| 2020/0315830 A1 * | 10/2020 | Kim | A61F 5/013 | |

* cited by examiner

THIGH LINK (120) : 0°
ROTARY RING (140) : 0°
INTERNAL GEAR (410) : 0°
EXTERNAL GEAR (420) : 0°

THIGH LINK *(120)* : 60°
ROTARY RING *(140)* : 60°
INTERNAL GEAR *(410)* : 0°
EXTERNAL GEAR *(420)* : 0°

THIGH LINK *(120)* : 80°
ROTARY RING *(140)* : 80°
INTERNAL GEAR *(410)* : 20°
EXTERNAL GEAR *(420)* : 60°

WEARABLE CHAIR

CROSS REFERENCE TO RELATED APPLICATION

The present application claims under 35 U.S.C. § 119(a) the benefit of Korean Patent Application No. 10-2019-0039680, filed Apr. 4, 2019, the entire contents of which are incorporated by reference herein.

BACKGROUND

1. Technical Field

The present disclosure relates to a wearable chair, more particularly, to the wearable chair including a contact link configured to come into contact with the ground at a predetermined position from a wearer's heels when the wearer is in a sitting position.

2. Description of the Related Art

Wearable robots having various purposes such as helping workers carry heavy loads at industrial sites, helping disabled, elderly, or infirm persons move by assisting muscular strength, helping patients with a muscular disease for rehabilitation, or helping soldiers carry heavy military gear have been actively developed.

In general, wearable robots are manufactured by organically assembling links, which act as joints similar to those of a human body, in shapes that can be worn on a human body. These wearable robots may be worn by a user such that the user can perform high-load work requiring force over the general limit of the human muscular strength without help of specific external machines by assisting the muscular strength of the user's upper limbs or lower limbs.

However, an active type-wearable robot that assists muscular strength using power typically has a problem in that it is relatively heavy and requires complicated control mechanisms with a controller, so there is a problem that stability is low and a sitting angle is limited.

Accordingly, a passive type-wearable chair that is light and can support a large load is required. However, passive type-wearable chairs according to the related art have a structure that comes in contact with the ground in a small area adjacent to the heels of a wearer and is spaced apart from the center of gravity when the wearer is in a sitting position, so there is a problem in that they may be unstable, and thus dangerous.

Further, there may be a safety problem in that, for example, support links, to which a supporting force for supporting a load between the support links corresponding to the thighs and calves of a wearer is applied, may be stuck in the body or clothes while rotating between the thigh links and the calf links.

The description provided above as a related art of the present disclosure is just for helping understanding the background of the present disclosure and should not be construed as being included in the related art known by those skilled in the art.

SUMMARY

The present disclosure provides a wearable chair that protrudes behind the heels of a wearer to stably support a center of gravity when the wearer is in a sitting position.

In accordance with an aspect of the present disclosure, a wearable chair includes: a thigh link extending in an extension direction of a wearer's thigh to be connected to the wearer's thigh; a crus link extending in an extension direction of the wearer's crus to be connected to the wearer's crus, having an upper end portion rotatably coupled to a lower end portion of the thigh link, and prevented from relatively rotating such that an angle between the crus link and the thigh link is less than a sitting angle; and a contact link having a first end rotatably coupled to a lower end portion of the crus link and a second end coming in contact with the ground at a predetermined position from the crus link by rotating with respect to the first end with relative rotation between the thigh link and the crus link when the wearer is in the sitting position.

The wearable chair may further include a crus holder coupled to the crus link in contact with the crus of the wearer so as to slide in the extension direction of the crus link.

The lower end portion of the crus link may come in contact with the ground due to the crus link sliding down with respect to the crus holder when the wearer is in the sitting position.

The wearable chair may further include: a stopper locked to the lower end portion of the thigh link to rotate integrally with the thigh link; and stopping steps formed at the upper end portion of the crus link and stopping relative rotation of the stopper to prevent relative rotation such that the angle between the thigh link and the crus link is less than the sitting angle.

Coupling steps protruding outward may be formed on the lower end portion of the thigh link at a plurality of angular positions in a relative rotational direction to the crus link, the stopper may rotate integrally with the thigh link by being locked to the coupling steps, and the sitting angle may be changed in accordance with the angular position of the coupling steps to which the stopper is locked.

The crus link may include: a housing having an upper end portion rotatably coupled to the lower end portion of the thigh link and a lower end portion rotatably coupled to the contact link; and a slider coupled to the housing to be able to slide in an extension direction of the housing, and may further include: a rotary ring coupled to the lower end portion of the thigh link to be able to relatively rotate to the thigh link, and connected to the slider to slide the slider by rotating; a stopper integrally combined with the rotary ring and locked to the lower end portion of the thigh link to rotate integrally with the rotary ring and the thigh link; and a retainer preventing sliding between the slider and the housing when the angle between the thigh link and the crus link is the sitting angle.

Coupling steps protruding outward may be formed on the lower end portion of the thigh link at a plurality of angular positions in a relative rotational direction to the crus link, the rotary ring may be separably coupled to the stopper, the stopper may be locked to the coupling steps to rotate integrally with the thigh link when the stopper is integrally combined with the rotary ring, and the sitting angle may be changed by relative rotation of the rotary ring to the thigh link according to the angular positions of the coupling steps to which the stopper is locked.

The retainer may include: though-holes formed through both sides of the housing surrounding both sides of the slider; and fixing members integrally moving in a sliding direction of the slider and disposed inside the slider to be able to slide to both sides of the slider, and when the fixing members slide to both sides of the slider and are inserted into the through-holes, sliding of the slider may be stopped.

The retainer may further include a cam assembly disposed over the slider and coupled to the slider to be able to slide in the sliding direction of the slider, and connected to perform a straight motion by a rotational portion of the rotary ring; and guide protrusions protruding in a direction perpendicular to a sliding direction of the fixing members may be respectively formed on the fixing members, the cam assembly may have a cam hole in which the guide protrusions of the fixing members are inserted and can vertically slide a predetermined distance, and the cam hole may be formed such that the guide protrusions of the fixing members come close to each other when the guide protrusions slide down.

The contact link may rotate with relative rotation between the thigh link and the crus link in a rotational section where the angle between the thigh link and the crus link is between the sitting angle and a pressing angle obtained by adding a linkage angle to the sitting angle, and the contact link may be fixed in a free section where the angle between the thigh link and the crus link is the pressing angle or more even though the thigh link and the crus link rotate relatively to each other.

The wearable chair may include: a rotary ring fixed to the lower end portion of the thigh link to rotate integrally with the thigh link; an internal gear having inner teeth on the inner side, coupled to the rotary ring to freely rotate in the free section of the thigh link and the crus link, and locked to the rotary ring to integrally rotate in the rotational section of the thigh link and the crus link; and an external gear having outer teeth formed on the outer side to engage with the inner teeth of the internal gear and connected to the contact link to rotate with the contact link.

The external gear may be smaller in number of teeth than the internal gear, thereby being able to accelerate rotation of the internal gear.

The crus link may include: a housing having an upper end portion rotatably coupled to the lower end portion of the thigh link and a lower end portion rotatably coupled to the contact link; and a slider slidably coupled to the housing in an extension direction of the housing, and the slider may rotate the contact link by sliding with relative rotation between the thigh link and the crus link.

The wearable chair may further include a transmission link having a first end connected to operate with relative rotation between the thigh link and the crus link and a second end connected to the slider, thereby converting a rotational motion according to relative rotation between the thigh link and the crus link into a straight motion of the slider.

The first end of the contact link may be rotatably coupled to a lower end portion of the housing, and the wearable chair may further include a connection link having a first end portion rotatably coupled to the slider and a second end portion coupled at a predetermined distance from the first end of the contact link coupled to the lower end portion of the housing such that the slider rotates the contact link by sliding.

According to the present disclosure, there is an effect by use of the wearable chair such that it is possible to stably support a center of gravity thereof by a contact link that comes in contact with the ground at a predetermined position behind the heels of a wearer when the wearer is in a sitting position.

Further, there is an effect in that it is possible to stably support a weight of the wearer at a sitting angle by stopping rotation of a stopper and fixing a slider so as not to slide at the sitting angle.

Further, there is an effect in that it is possible to easily change the sitting angle of the wearer by separating and coupling the stopper.

Further, there is an effect in that it is possible to release the slider to be able to move without specific operation when the wearer stands up from the sitting position.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1A:
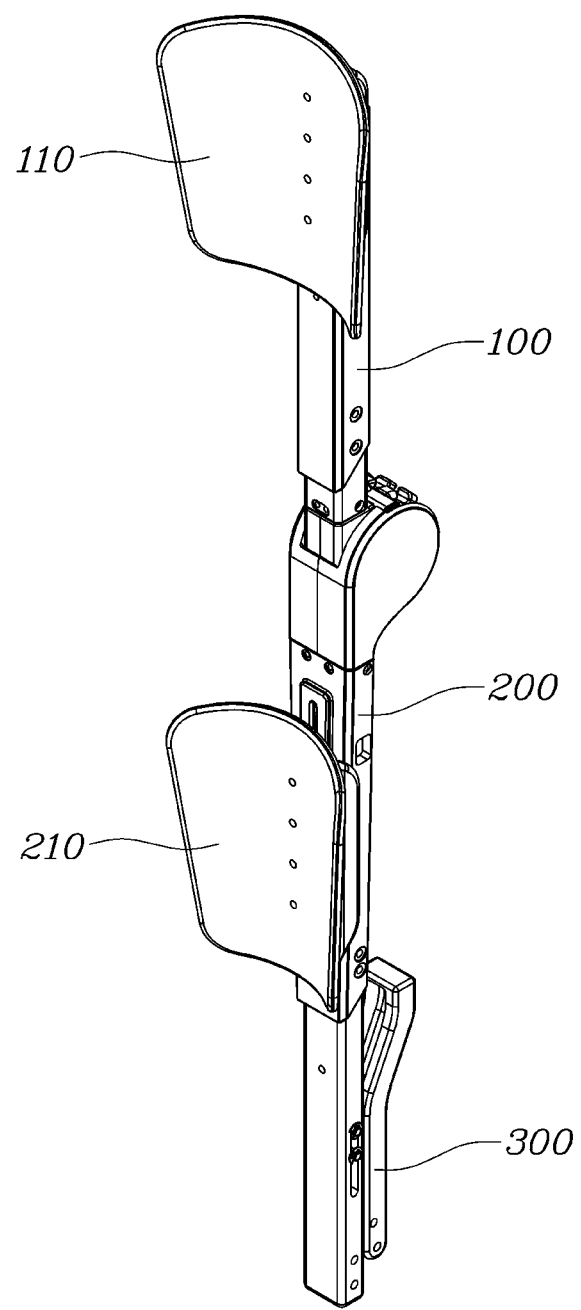
FIGS. 1A and 1B are perspective views showing a state in which a wearable chair according to an embodiment of the present disclosure has been unfolded.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

A specific structural or functional description of embodiments of the present disclosure disclosed in the specification or application is given merely for the purpose of describing the embodiment according to the present disclosure. Therefore, the embodiments according to the present disclosure may be implemented in various forms, and the present disclosure should not be construed as being limited to the embodiments described in the specification or application.

Various changes and modifications may be made to the embodiments according to the present disclosure, and therefore particular embodiments will be illustrated in the drawings and described in the specification or application. However, it should be understood that embodiments according to the concept of the present disclosure are not limited to the particular disclosed embodiments, but the present disclosure includes all modifications, equivalents, and alternatives falling within the spirit and scope of the present disclosure.

Although the terms "ordinal numbers" such as first, second and the like may be used to describe various elements, the elements should not be defined by the terms. The terms are merely used to distinguish an element from another element, and thus a first element may be named a second element while the second element may be similarly named the first element, without departing from the scope of protection according to the concept of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to other component, it should be understood that there is no component therebetween. The other expressions of describing a relation between structural elements, i.e. "between" and "merely between" or "neighboring" and "directly neighboring", should be interpreted similarly to the above description.

Unless defined differently, all terms used herein, which include technical terminologies or scientific terminologies, have the same meaning as that generally understood by a person skilled in the art to which the present disclosure belongs. It should be interpreted that the terms, which are identical to those defined in general dictionaries, have the meaning identical to that in the context of the related technique. The terms should not be ideally or excessively interpreted as a formal meaning unless not clearly defined.

Hereinafter, a preferred embodiment of the present disclosure will be described in detail with reference to the accompanying drawings. Similar reference numerals presented in the drawings denote similar elements.

Figure 1B:
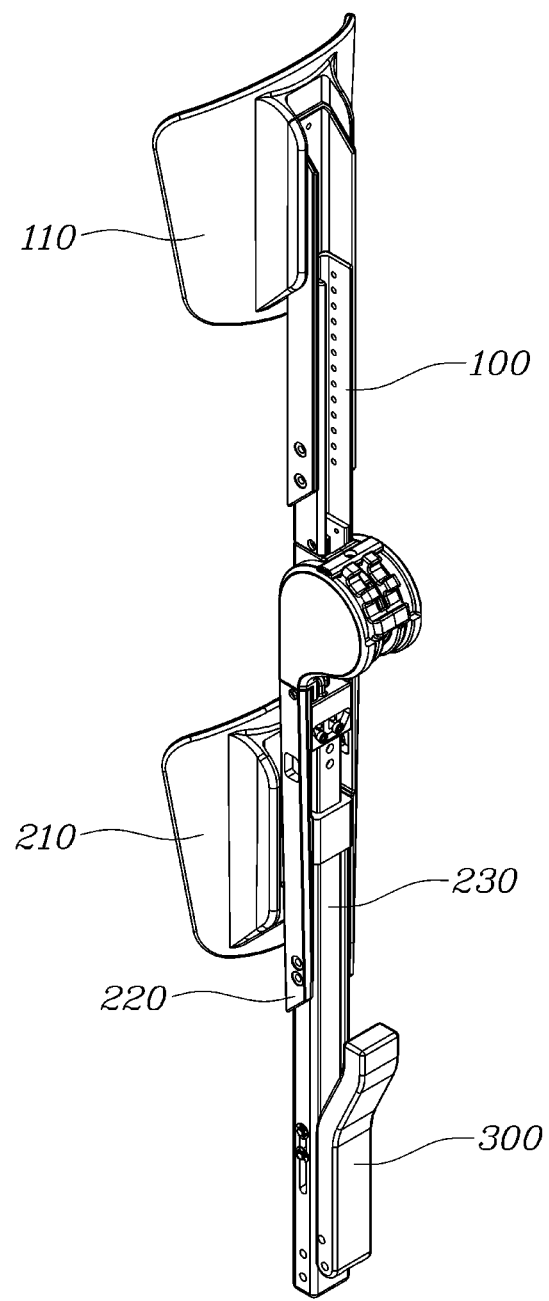
Figure 2A:
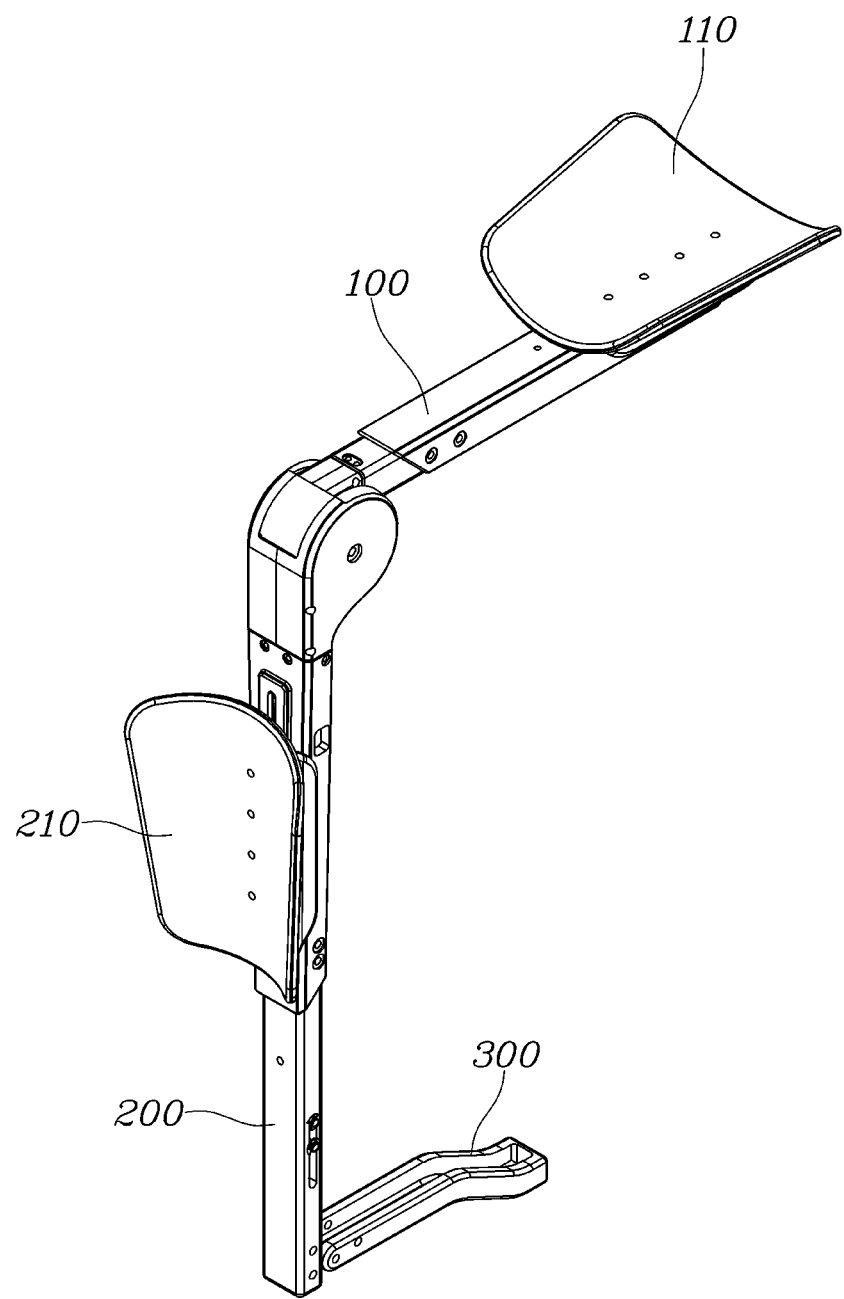
FIGS. 2A and 2B are perspective views showing a state in which the wearable chair according to an embodiment of the present disclosure has been folded with a predetermined sitting angle.
Figure 2B:
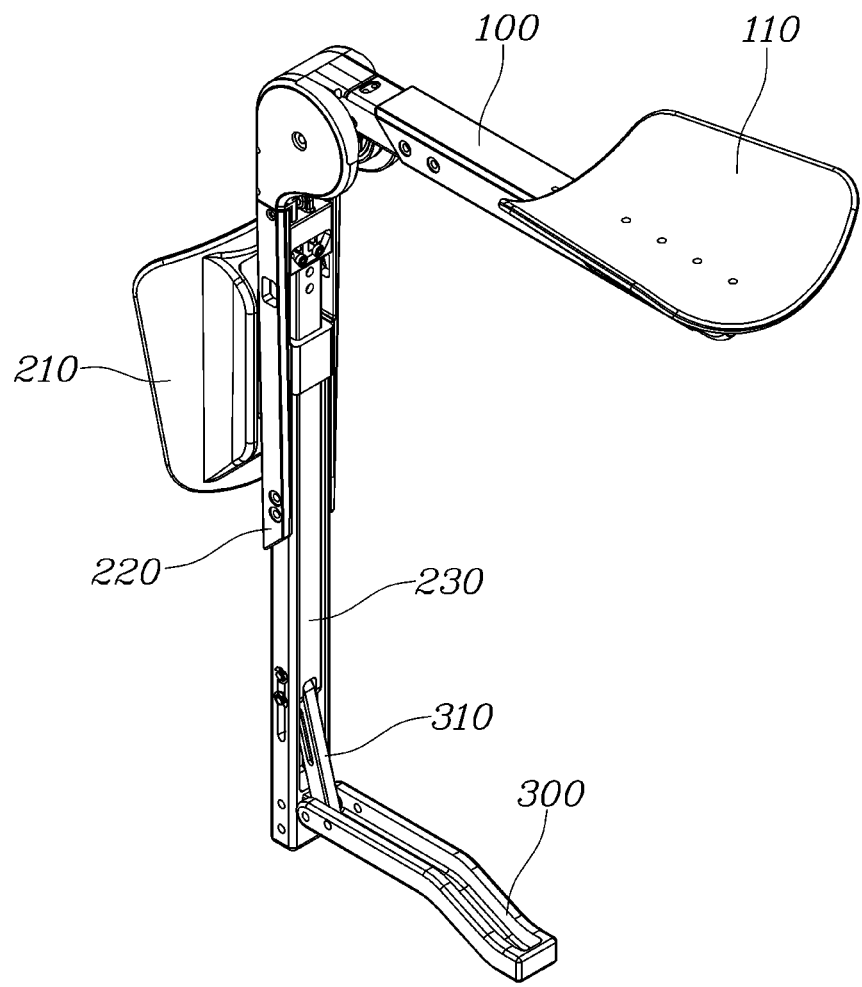
Figure 3:
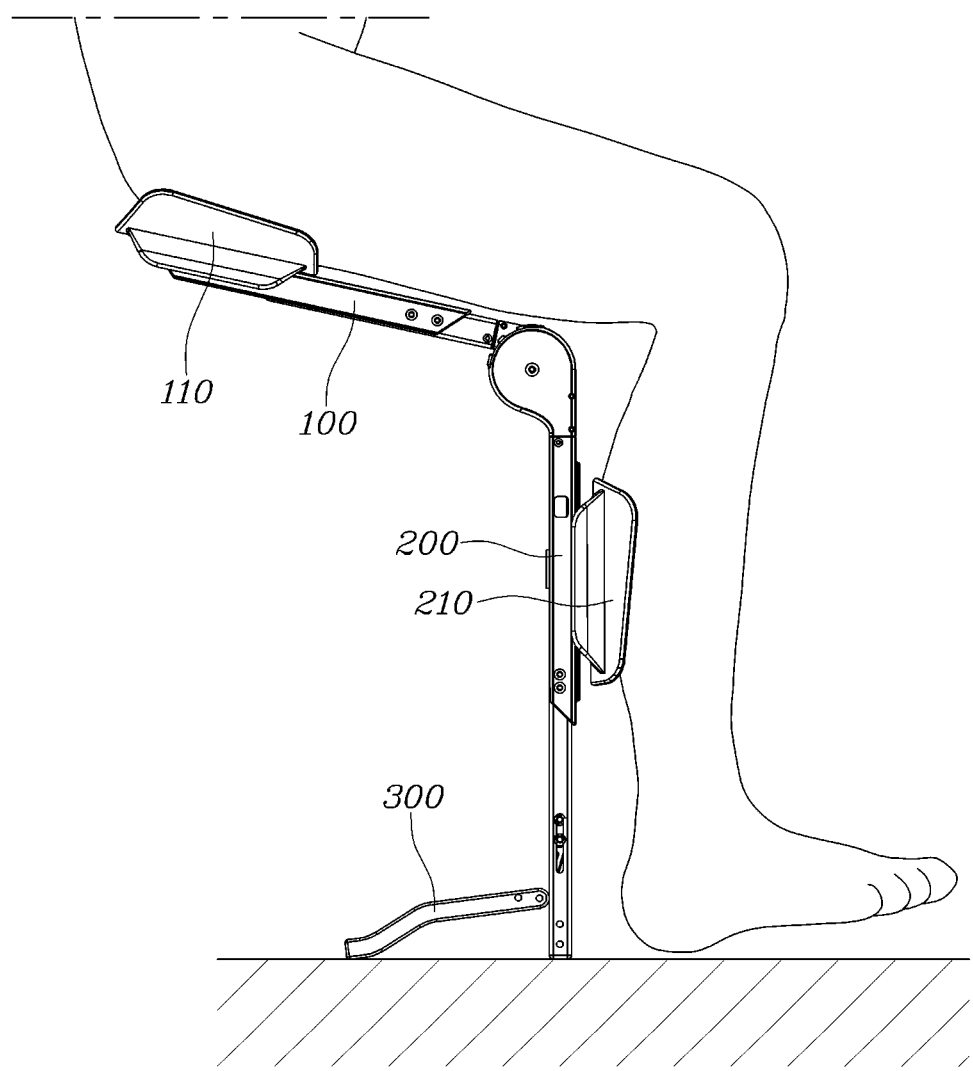
FIG. 3 is a side view showing a state in which a user wears the wearable chair according to an embodiment of the present disclosure.

FIGS. 1A and 1B are perspective views showing a state in which a wearable chair according to an embodiment of the present disclosure has been unfolded, FIGS. 2A and 2B are perspective views showing a state in which the wearable chair according to an embodiment of the present disclosure has been folded with a predetermined sitting angle, and FIG. 3 is a side view showing a state in which a user wears the wearable chair according to an embodiment of the present disclosure.

Referring to FIGS. 1 to 3, a wearable chair according to an embodiment of the present disclosure includes: a thigh link 100 extending in an extension direction of a wearer's thigh to be connected to the wearer's thigh; a crus link 200 extending in the extension direction of the wearer's crus to be connected to the wearer's crus, having an upper end portion rotatably coupled to the lower end portion 120 of the thigh link 100, and prevented from relatively rotating such that the angle between the crus link 200 and the thigh link 100 is less than a sitting angle; and a contact link 300 having a first end rotatably coupled to the lower end portion of the crus link 200 and a second end coming in contact with the ground at a predetermined position from the crus link 200 by rotating with respect to the first end with relative rotation between the thigh link 100 and the crus link 200 when the wearer is in a sitting position.

The thigh link 100 can be extended in the extension direction of the wearer's thigh to correspond to the thigh. A thigh holder 110 coupled in contact with the wearer's thigh may be further coupled to the thigh link 100. The thigh holder 110 may be fixed to the wearer's thigh region by a specific harness (not shown).

The crus link 200 can act like the wearer's knee joint by being rotatably coupled to the lower end portion 120 of the thigh link 100. That is, the upper end portion 140 of the crus link 200 can be rotatably coupled to the lower end portion 120 of the thigh link 100 at the wearer's knee joint.

In particular, the crus link 200 may relatively rotate when the angle from the thigh link 100 is the sitting angle or more, but may be prevented from relatively rotating and prevented from rotating less than the sitting angle when the angle is the sitting angle.

The first end of the contact link 300 is rotatably coupled to the lower end portion of the crus link 200, so the contact link 300 can rotate about the first end coupled to the lower end portion of the crus link 200. In particular, the contact link 300 rotates with relative rotation between the thigh link 100 and the crus link 200, so the second end of the contact link 300 can come in contact with the ground at a predetermined distance from the crus link 200 when the wearer is in the sitting position.

Accordingly, there is the effect that the center of gravity is stably supported by the contact link 300 that comes in contact with the ground at a predetermined distance behind the wearer's heels when the wearer is in the sitting position.

Further, the wearable chair may further include a crus holder 210 coupled to the crus link 200 in contact with the crus of the wearer to be able to slide in the extension direction of the crus link 200. The crus holder 210 may be coupled to the crus of the wearer by a specific harness (not shown) and can slide on the crus link 200 in the state fixed to the crus of the wearer.

Accordingly, when the wearer is in a standing or sitting position, the crush link 200 slides up or down along the crus of the wearer, so it is possible to compensate for movement of the crus link 200 due to acting like the knee joint of the wearer at a predetermined distance from the knee joint of the wearer. That is, the crus link 200 can slide down when the wearer is in the sitting position, and can slide back upward when the wearer stands up.

In particular, when the wearer is in the sitting position, the crus link 200 slides down with respect to the crus holder 210, so the lower end portion of the crus link 200 can come in contact with the ground.

That is, when the wearer is in the sitting position, the crus link 200 slides down with the crus holder 210 fixed to the crus of the wearer, so the lower end portion can come in contact with the ground. Accordingly, when the wearer is in the sitting position, the lower end portion of the crus link 200 and the second end of the contact link 300 both come in contact with the ground, so there is the effect that the weight of the wearer can be stably supported.

Further, when the wearer stands up, the crus holder 210 slides back upward and the lower end portion can be spaced apart form the ground and does not interfere with walking of the wearer. Accordingly, the wearer can freely walk.

Figure 4A:
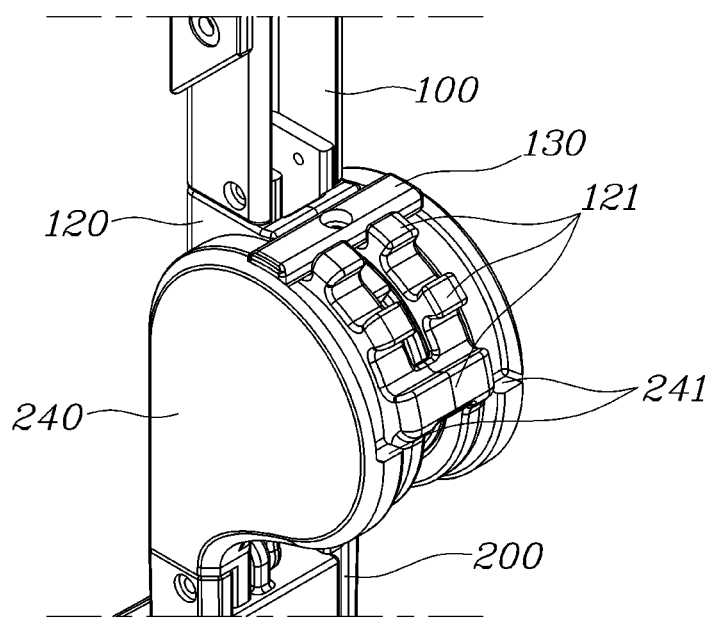
FIGS. 4A to 4C are views showing states in which the wearable chair according to an embodiment of the present disclosure has been converted to various sitting angles.
Figure 4B:
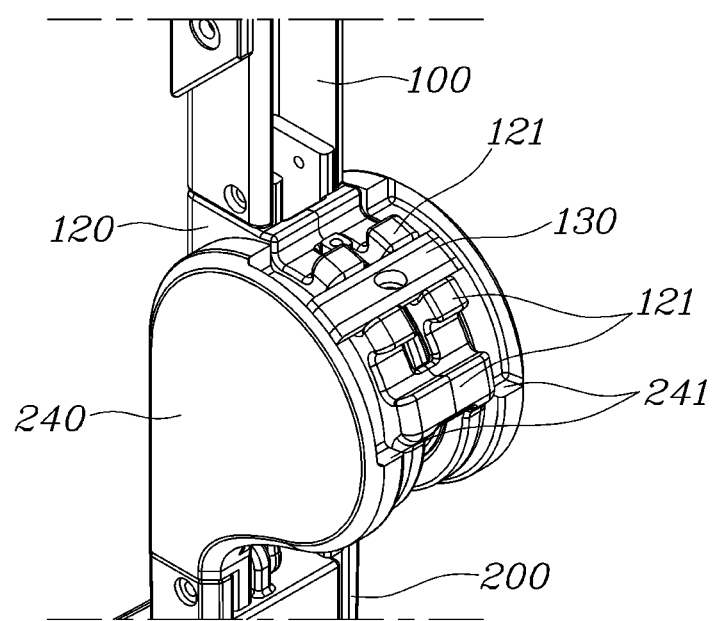
Figure 4C:
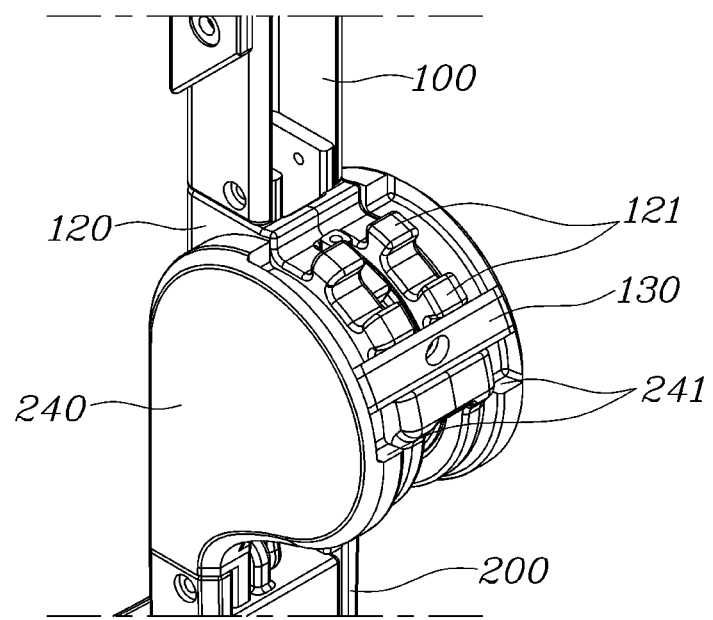

FIGS. 4A to 4C are views showing states in which the wearable chair according to an embodiment of the present disclosure has been converted to various sitting angles.

Referring to FIGS. 4A to 4C, the wearable chair may further include: a stopper 130 locked to the lower end portion 120 of the thigh link 100 to rotate integrally with the thigh link 100; and stopping steps 241 formed at the upper end portion 240 of the crus link 200 and stopping relative rotation of the stopper 130 to prevent relative rotation such that the angle between the thigh link 100 and the crus link 200 is less than the sitting angle.

The stopper 130 is locked to the lower end portion 120 of the thigh link 100 to rotate with the thigh link 100, and the thigh link 100 and the crus link 200 can be coupled to be able to relatively rotate over the sitting angle. However, the stopping steps 241 locked to the stopper 130 to stop rotation of the stopper 130 at the sitting angle is formed at the upper end portion 240 of the crus link 200, so it is possible to prevent the thigh link 100 from further rotating.

That is, since the stopping steps 241 that stops rotation of the stopper 130 are further formed at the crus link 200 separately from the retainer 500 that stops sliding of the slider 230 to be described below, there is the effect that it is possible to more stably stop relative rotation between the thigh link 100 and the crus link 200 at the sitting angle.

Further, coupling steps 121 protruding outward are formed on the lower end portion 120 of the thigh link 100 at a plurality of angular positions in the relative rotational direction to the crus link 200, the stopper 130 rotates integrally with the thigh link 100 by being locked to the coupling steps 121, and the sitting angle can be changed in accordance with the angular position of the coupling steps 121 to which the stopper 130 is locked.

Since the coupling steps 121 protrudes outward at the lower end portion 120 of the thigh link 100, the stopper 130 is locked, so the stopper 130 and the thigh link 100 can integrally rotate. In particular, the coupling steps 121 may be formed at a plurality of angular positions in the relative rotational direction to the upper end portion 240 of the crus link 200.

The stopper 130 can be locked to one of the coupling steps 121 formed at a plurality of angular positions. That is, the stopper 130 is separably combined with the thigh link 100 and is locked to the coupling steps 121 at any one of the angular positions to rotate integrally with the thigh link 100, so the sitting angle can be changed.

The sitting angle may be set such that the angle between the thigh link 100 and the crus link 200, for example, is 100 degrees (FIG. 4A), 120 degrees (FIG. 4B), and 140 degrees (FIG. 4C). The coupling steps 121 are formed such that the angle where the stopper 130 fixed increases in increments of 20 degrees, so when the thigh link 100 and the crus link 200 are rotated to 80 degrees, 60 degrees, and 40 degrees in the folding direction from the fully unfolded state, rotation of the stopper 130 can be stopped by the stopping steps 241.

Figure 5:
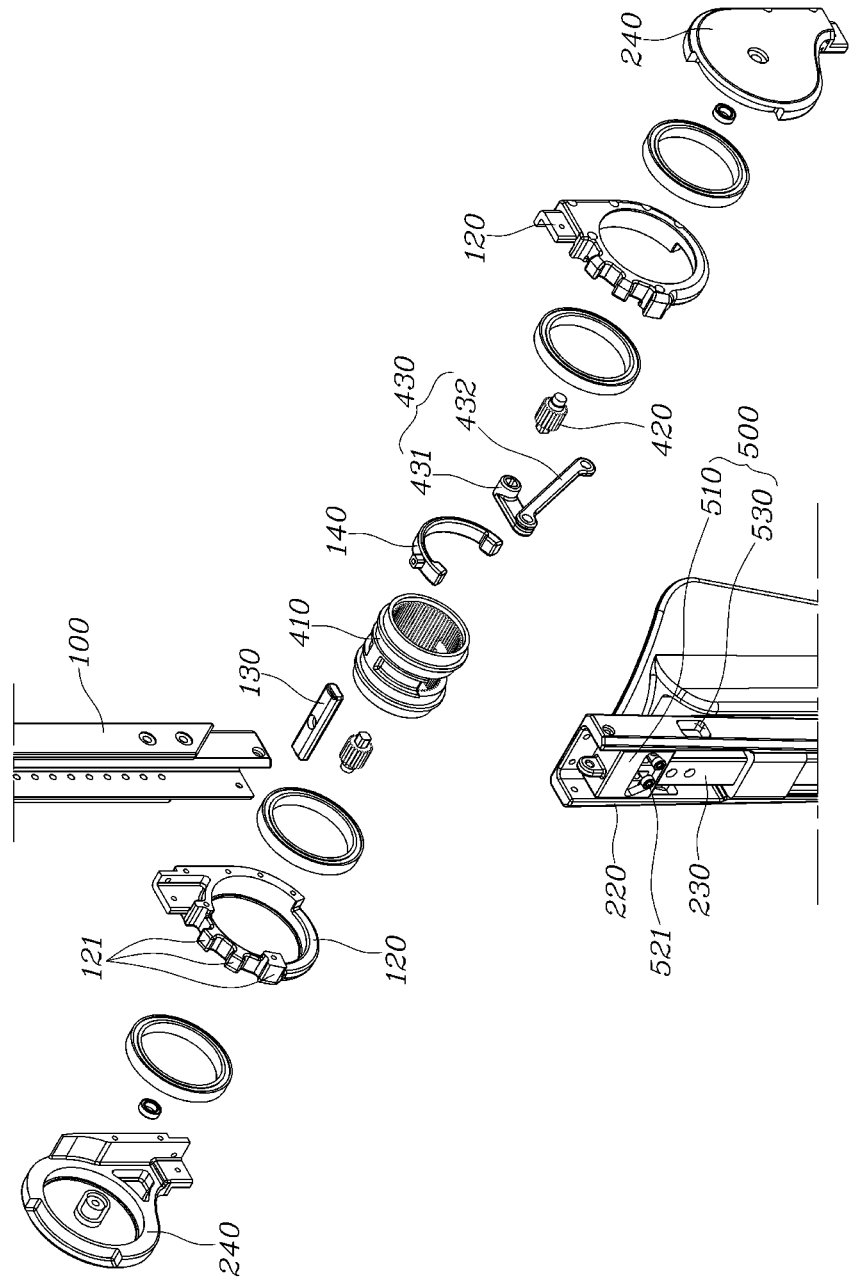
FIG. 5 is an exploded view showing components between a lower end portion of a thigh link and an upper end portion of a crus link.

FIG. 5 is an exploded view showing the components between the lower end portion 120 of the thigh link 100 and the upper end portion 240 of the crus link 200.

Referring to FIG. 5, the crus link 200 includes: a housing 220 having an upper end portion rotatably coupled to the lower end portion 120 of the thigh link 100 and a lower end portion rotatably coupled to the contact link 300; and a slider 230 coupled to the housing 220 to be able to slide in the extension direction of the housing 200, and may further include: a rotary ring 140 coupled to the lower end portion 120 of the thigh link 100 to be able to relatively rotate to the thigh link 100 and connected to the slider 230 to slide the slider 230 by rotating; the stopper 130 integrally combined with the rotary ring 140 and locked to the lower end portion 120 of the thigh link 100 to rotate integrally with the rotary ring 140 and the thigh link 100; and the retainer 500 preventing sliding between the slider 230 and the housing 220 when the angle between the thigh link 100 and the crus link 200 is the sitting angle.

The housing 220 is formed in a shape surrounding the slider 230 therein and the upper end portion of the housing 220 may be rotatably coupled to the lower end portion 120 of the thigh link 100. The housing 220 is combined with the crus holder 210 to slide with respect to each other and the lower end portion of the housing 220 can come in contact with the ground when the wearer is in the sitting position.

The slider 230 is disposed inside the housing 220 to be able to slide in the extension direction of the housing 220 and slides in the housing 220 with relative rotation of the thigh link 100 and the crus link 200, whereby it can be connected to the contact link 300 to rotate the contact link 300.

In particular, the rotary ring 140 may be coupled to the lower end portion 120 of the thigh link 100 to be able to rotate relatively to the thigh link 100. However, when the stopper 130 is coupled to the rotary ring 140 and is locked to the coupling steps 121 formed at the lower end portion 120 of the thigh link 100, whereby the rotary ring 140 can rotate integrally with the thigh tank 100. That is, when the rotary ring 140 is combined with the stopper 130, the rotary ring 140 can be coupled to the thigh link 100 to rotate integrally with the thigh link 100.

The rotary ring 140 may be connected with the slider 230 to slide the slider 230 by rotating. Accordingly, the slider 230 can slide in the housing 220 with relative rotation of the thigh link 100 and the crus link 200.

The retainer 500 can stop sliding between the slider 230 and the housing 220 when the angle between the thigh link 100 and the crus link 200 is the sitting angle. In particular, the retainer 50 can stop the slider 230 from sliding by fixing the slider 230 to the housing 220 at the position where the angle between the thigh link 100 and the crus link 200 is the sitting angle. Accordingly, at the sitting angle, rotation of the stopper 130 is stopped and the slider 230 is fixed so as not to slide, so there is the effect that stably supports the weight of the wearer at the sitting angle.

In particular, the coupling steps 121 protruding outward are formed on the lower end portion 120 of the thigh link 100 at a plurality of angular positions in the relative rotational direction to the crus link 200, the rotary ring 140 is separably coupled to the stopper 130, the stopper 130 is locked to the coupling steps 121 to rotate integrally with the thigh link 100 when it is integrally combined with the rotary ring 140, and the sitting angle can be changed by relative rotation of the rotary ring 140 to the thigh link 100 according to the angular positions of the coupling steps 121 to which the stopper 130 is locked.

The rotary ring 140 and the stopper 130 are separably combined, and when the stopper 130 is separated, the rotary ring 140 can be couple to be able to rotate relatively to the thigh link 100. When the angular position of the coupling steps 121 to which the stopper 130 is locked is changed, with the stopper 130 separated from the rotary ring 140, and the stopper 130 is coupled to the rotary ring 140, the rotary ring 140 that has rotated relatively to the thigh link 100 can be coupled to rotate integrally with the thigh link 100. Accordingly, relative rotation to the thigh link 100 is performed with the rotary ring 140 and the stopper 130 separated, so the sitting angle can be changed.

That is, by separating and rotating the stopper 130 and the rotary ring 140 relatively to the thigh link 100 and then re-coupling them, the stopper 130 can be stopped from rotating by the stopping steps 241 and the sitting angle between the thigh link 100 and the crus link 200 at which the slider 230 is stopped from sliding by the rotary ring 140 can be changed.

In particular, the retainer 500 includes: though-holes 530 formed through both sides of the housing 220 surrounding both sides of the slider 230; and fixing members 520 integrally moving in the sliding direction of the slider 230 and disposed inside the slider 230 to be able to slide to both sides of the slider 230. When the fixing members 520 slide to both sides of the slider 230 and are inserted into the through-holes 530, sliding of the slider 230 can be stopped.

Figure 6A:
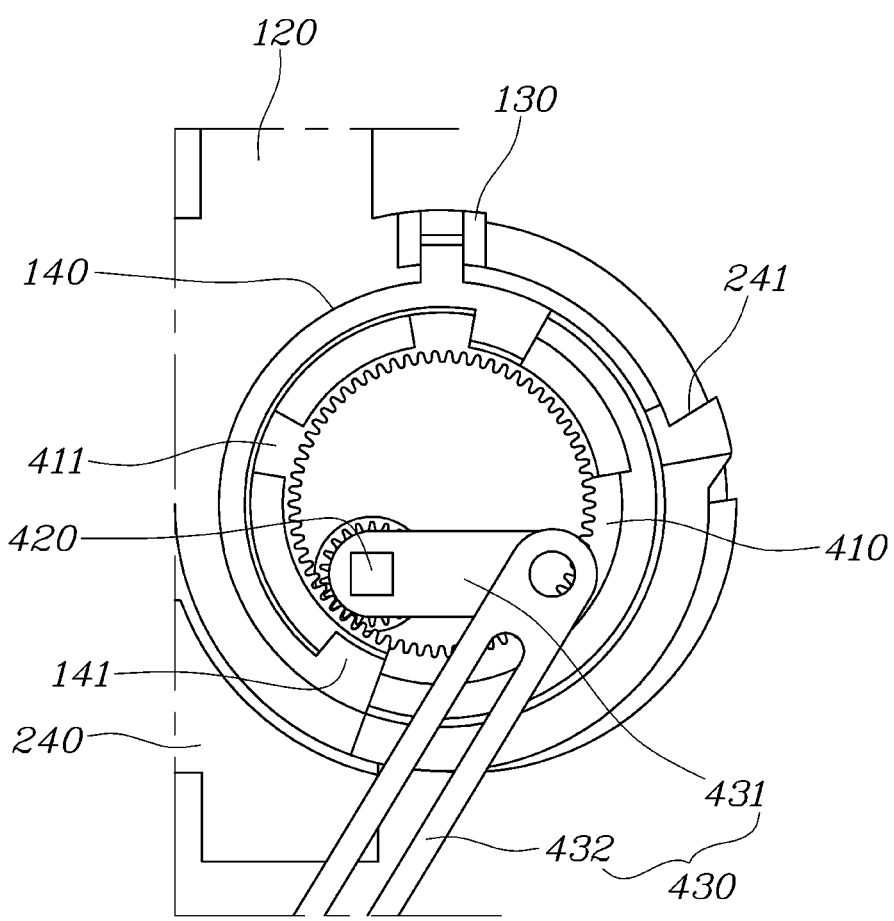
FIGS. 6A to 6C are views sliding of a slider due to relative rotation between the thigh link and the crus link.
Figure 6B:
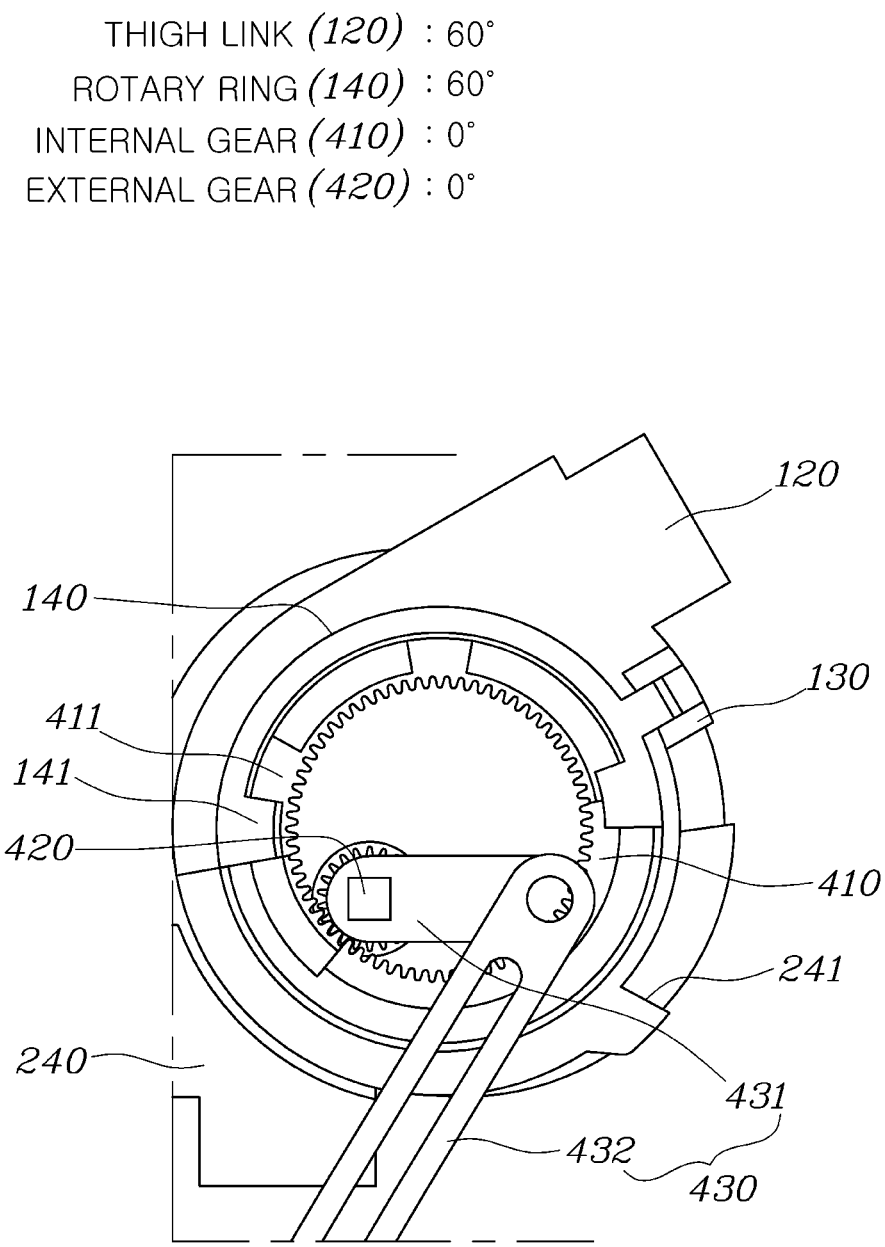
Figure 6C:
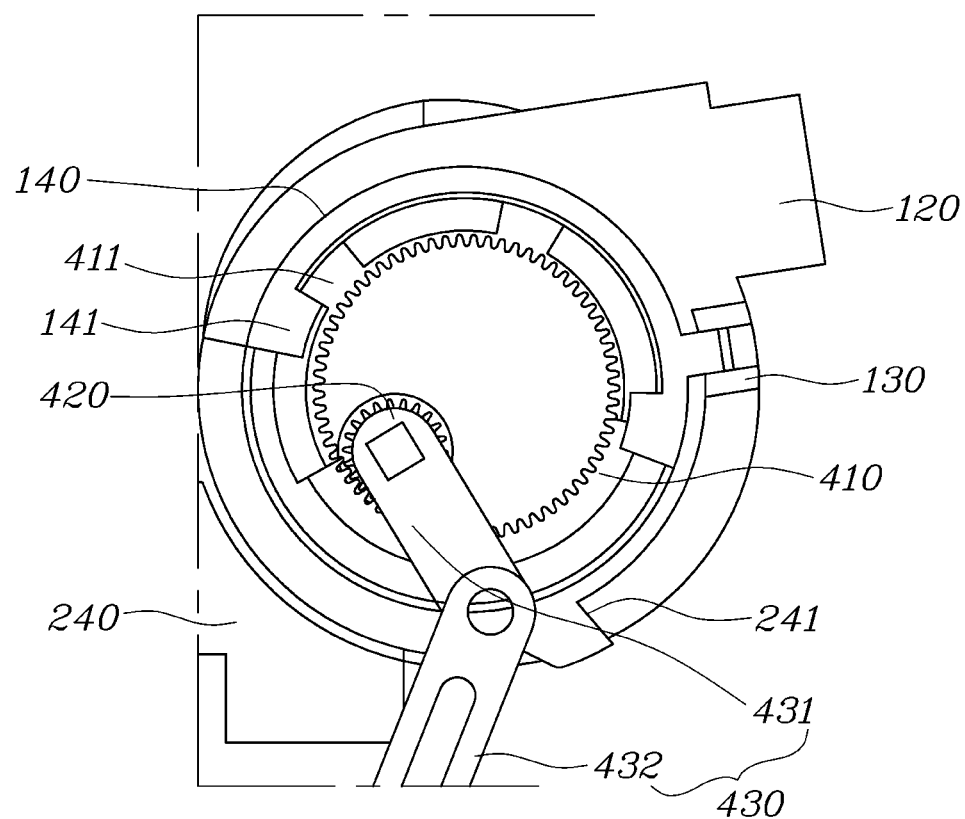

FIGS. 6A to 6C are views depicting sliding of the slider 230 due to relative rotation between the thigh link 100 and the crus link 200.

Sequentially referring to FIGS. 5 and 6A-6C, the contact link 300 rotates with relative rotation between the thigh link 100 and the crus link 200 in a rotational section where the angle between the thigh link 100 and the crus link 200 is between the sitting angle and a pressing angle obtained by adding a linkage angle to the sitting angle. Further, the contact link 300 can be fixed in a free section where the angle between the thigh link 100 and the crus link 200 is the pressing angle or more even though the thigh link 100 and the crus link 200 rotate relatively to each other.

FIGS. 6A to 6C show relative rotation between the thigh link 100 and the crus link 200, for example, when the sitting angle is set as 100 degrees and the pressing angle is 120 degrees by setting the predetermined linkage angle as 20 degrees.

Even though the thigh link 100 and the rotary ring 140 rotate 60 degrees until the angle between the thigh link 100 and the crus link 200 changes from 180 degrees to 120 degrees from the state of FIG. 6A to the state of FIG. 6B, an internal gear 410 and an external gear 420 to be described do not rotate. That is, the thigh link 100 and the rotary ring 140 can freely integrally rotate in the free section where the angle between the thigh link 100 and the crus link 200 is the pressing angle or more.

However, in the section where the thigh link 100 and the rotary ring 140 further rotate 20 degrees until the angle between the thigh link 100 and the crus link 200 changes from 120 degrees to 100 degrees from the state of FIG. 6B to the state of FIG. 6C, the internal gear 410 and the external gear 420 also rotate. That is, in the rotational section where the angle between the thigh link 100 and the crus link 200 is between the pressing angle and the sitting angle, the contact link 300 can rotate with relative rotation between the thigh link 100 and the crus link 200.

In particular, the wearable chair may include: the rotary ring 140 fixed to the lower end portion 120 of the thigh link 100 to rotate integrally with the thigh link 100; the internal gear 410 having inner teeth on the inner side, coupled to the rotary ring 140 to freely rotate in the free section of the thigh link 100 and the crus link 200, and locked to the rotary ring 140 to integrally rotate in the rotational section of the thigh link 100 and the crus link 200; and the external gear 420 having outer teeth formed on the outer side to engage with the inner teeth of the internal gear 410 and connected to the contact link 300 to rotate with the contact link 300.

When the rotary ring 140 is coupled to the stopper 130, the rotary ring 140 can be fixed to rotate integrally with the thigh link 100 because the stopper 130 is locked to the thigh link 100. The rotary ring 140 may be formed to surround a portion of the outer side of the internal gear 410 outside the internal gear 410 and may have locking protrusions 141 protruding inward.

The internal gear 410 may have inner teeth on the inner side and a portion of the outer side thereof may be surrounded by the rotary ring 140. The internal gear 410 may be coupled to freely relatively rotate in the free section of the thigh link 100 and the crus link 200, and may be locked to the rotary ring 140 in the rotational section of the thigh link 100 and the crus link 200.

In particular, locking protrusions 411 that are locked to the locking protrusions 141 of the rotary ring 140 in the rotational section of the thigh link 100 and the crus link 200 may be formed on the outer side of the internal gear 410. The locking protrusions 141 of the rotary ring 140 and the locking protrusions 411 of the internal gear 410 are locked to each other in the rotational direction of the thigh link 100 and the crus link 200, so the rotary ring 140 and the internal gear 410 integrally rotate. Further, the locking protrusions 141 and the locking protrusions 411 do not interfere with each other in the free section of the thigh link 100 and the crus link 200, so the rotary ring 140 and the internal gear 410 can freely relatively rotate.

The outer teeth formed on the outer side of the external gear 420 can be engaged with the inner teeth of the internal gear 410, and the external gear 420 can be rotated by rotation of the internal gear 410. In particular, the external gear 420 may be connected to the contact link 300 to rotate with the contact link 300. That is, when the external gear 420 rotates, the contact link 300 can rotate together.

In particular, the external gear 420 is smaller in number of teeth than the internal gear 410, so it can accelerate rotation of the internal gear 410. As exemplified in the figures, when the internal gear 410 rotates 20 degrees, the external gear 420 can be accelerated to rotate 60 degrees.

Accordingly, the predetermined rotational section of the thigh link 100 and the crus link 200 is relatively decreased, the contact link 300 can protrude only at an adjacent angle when the wearer is in the sitting position, and when the wearer walks, the wearer can freely walk without interference.

The wearable chair may further include a transmission link 430 having a first end connected to operate with relative rotation between the thigh link 100 and the crus link 200 and a second end connected to the slider 230, thereby converting a rotational motion according to relative rotation between the thigh link 100 and the crus link 200 into a straight motion of the slider 230.

In particular, the transmission link 430 is a part that converts a rotational motion into a straight motion like a crank assembly. The first end of the transmission link 430 is coupled to the external gear 420 to be rotated by rotation of the external gear 420, and the second end of the transmission link 430 is coupled to a cam assembly 510 to be described below, thereby being able to slide the slider 230.

The transmission link 430, particularly, may be composed of a first link 431 coupled to the external gear 420 to rotate integrally with the external gear 420 and a second link 432 rotatably coupled to the first link and coupled to the cam assembly 510.

Figure 7:
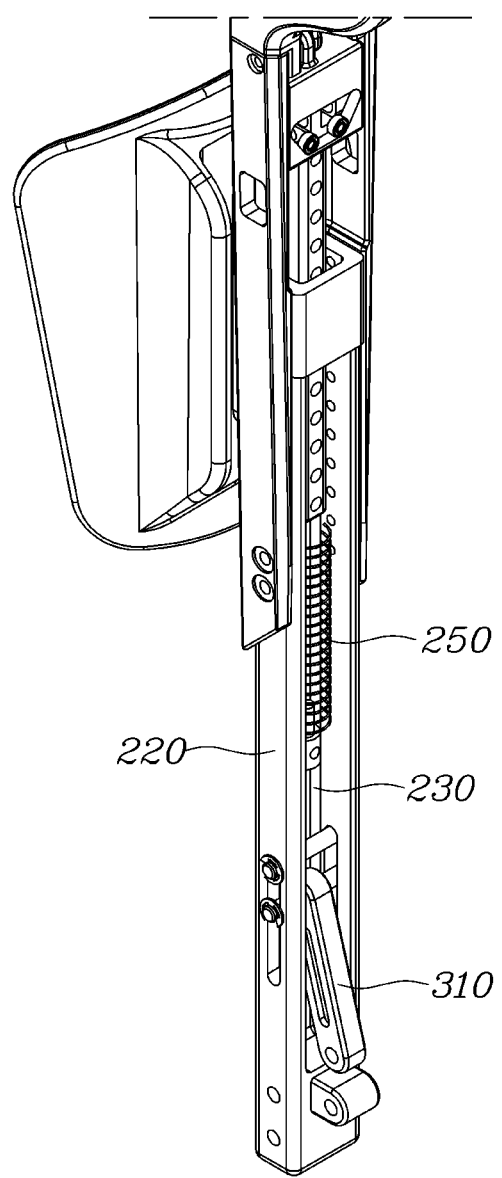
FIG. 7 is a perspective view showing a rear side of the crus link according to an embodiment of the present disclosure.

FIG. 7 is a perspective view showing the rear side of the crus link 200 according to an embodiment of the present disclosure.

Referring to FIG. 7, the crus link 200 includes: the housing 220 having an upper end portion rotatably coupled to the lower end portion 120 of the thigh link 100 and a lower end portion rotatably coupled to the contact link 300; and the slider 230 slidably coupled to the housing 220 in the extension direction of the housing 220. The slider 230 can rotate the contact link 300 by sliding with relative rotation between the thigh link 100 and the crus link 200.

In particular, the first end of the contact link 300 rotatably coupled to the lower end portion of the housing 220 and the second end of the contact link 300 is fixed adjacent to the crus link 200 and can come in contact with the ground by rotating about the first end when the wearer is in the sitting position.

In particular, the first end of the contact link 300 is rotatably coupled to the lower end portion of the housing 220 and the wearable chair may further include a connection link 310 having a first end portion rotatably coupled to the slider 230 and a second end portion coupled at a predetermined distance from the first end of the contact link 300 coupled to the lower end portion of the housing 220 such that the slider 230 rotates the contact link 300 by sliding.

The second end portion of the connection link 310 may be coupled at a predetermined distance from the first end of the contact link 300 coupled to the lower end portion of the housing 220. In particular, the second end portion of the connection link 310 is coupled at a position adjacent to the first end of the contact link 300, so it is possible to maximize rotation of the contact link 300 due to rotation of the connection link 310 that is rotated by sliding of the slider 230 coupled to the first end portion of the connection link 310.

Further, the wearable chair may further include a first elastic body 250 disposed between the housing 220 and the slider 230 to apply elasticity such that the slider 230 slides upward with respect to the housing 220. Accordingly, when there is no external force, the slider 230 is slid up by elasticity, so the contact link 300 can be fixed with the second end fixed adjacent to the crus link 200.

Figure 8A:
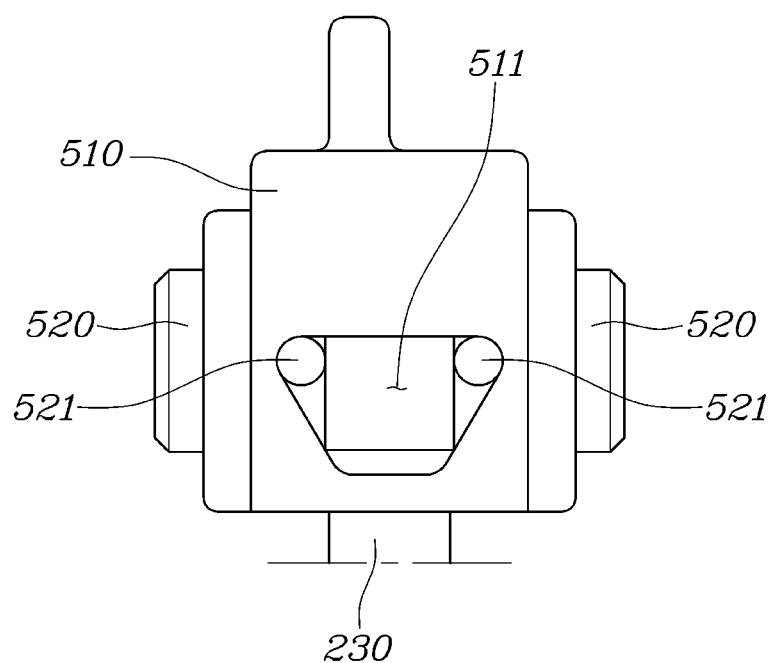
FIGS. 8A and 8B are views showing an anti-sliding mechanism of a retainer.
Figure 8B:
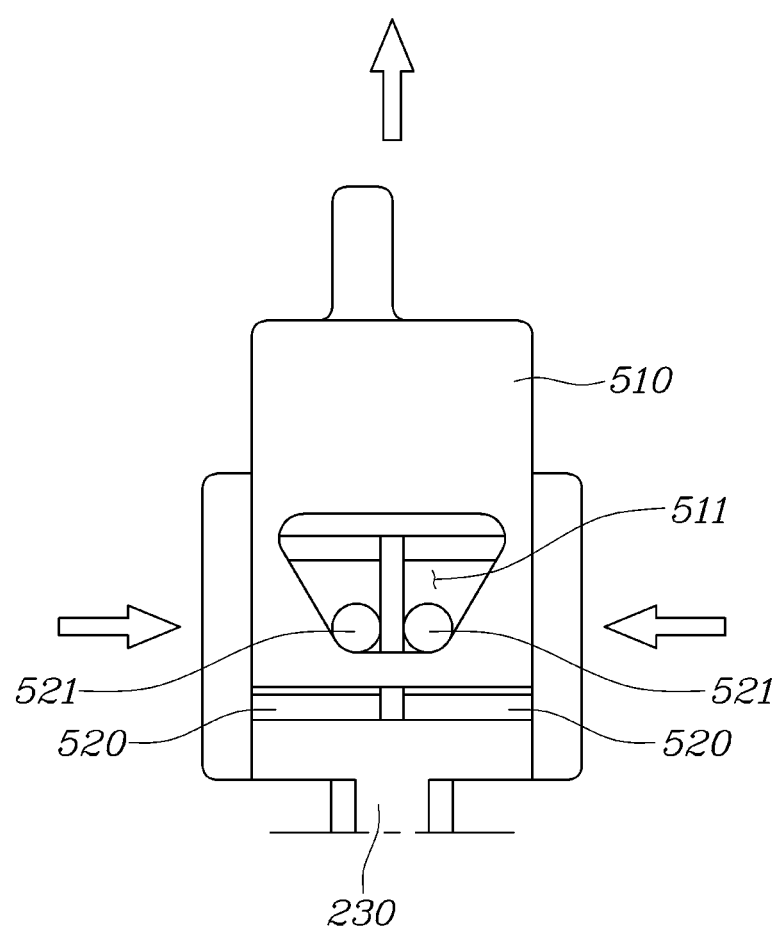

FIGS. 8A and 8B are views showing an anti-sliding mechanism of a retainer.

Referring to FIGS. 8A and 8B, a retainer 500 includes: though-holes 530 formed through both sides of the housing 220 surrounding both sides of the slider 230; and fixing members 520 integrally moving the slid direction of the slider 230 and disposed inside the slider 230 to be able to slide to both sides of the slider 230. When the fixing members 520 slide to both sides of the slider 230 and are inserted into the through-holes 530, sliding of the slider 230 can be stopped.

The fixing members 520 are coupled to be able to slide to both sides of from the slider 230 and may be coupled to move integrally with vertical sliding of the slider 230. The through-holes 530 that the fixing members 520 are inserted in or pass through may be formed at portions of both sides of the housing 220.

In particular, the through-holes 530 may be formed at the positions of the fixing members 520 when the angle between the thigh link 100 and the crus link 200 is the sitting angle such that the fixing members 520 are inserted when the angle between the thigh link 100 and the crus link 200 is the sitting angle.

Accordingly, the fixing members 520 are inserted in the through-holes 530 when the angle between the thigh link 100 and the crus link 200 is the sitting angle, so sliding of the housing 220 and the slider 230 is stopped. Therefore, the angles of the thigh link 100 and the crus link 200 can be fixed.

The retainer 500 further includes a cam assembly 510 disposed over the slider 230 and coupled to the slider 230 to be able to slide in the sliding direction of the slider 230, and connected to perform a straight motion by a rotational portion of the rotary ring 140. Guide protrusions 521 protruding in a direction perpendicular to the sliding direction of the fixing members 520 are respectively formed on the fixing members 520. The cam assembly 510 has a cam hole 511 in which the guide protrusions 521 of the fixing members 520 are inserted and can vertically slide a predetermined distance. The cam hole 511 may be formed such that the guide protrusions 521 of the fixing members 520 come close to each other when they slide down.

The cam assembly 510 may be disposed over the slider 230 and may be coupled to be able to slide a predetermined distance with the slider 230. The cam assembly 510 is rotatably coupled to the transmission link 430, so the cam assembly 510 can be pulled upward or pressed downward by rotation of the transmission link 430 due to rotation of the external gear 420.

The guide protrusions 521 of the fixing members 520 may protrude in a direction perpendicular to the sliding direction of the fixing members 520 and the sliding direction of the slider 230.

The cam hole 511 that guides the guide protrusions 521 of the fixing members 520 sliding in therein may be formed at the cam assembly 510. The cam hole 511 may have a shape that has a predetermined vertical length and narrows downward.

Accordingly, when the cam assembly 510 is pulled up by the transmission link 430, the cam assembly 510 slides up with respect to the fixing members 520 and the slider 230. Further, as the cam assembly 510 moves up, the guide protrusions 521 of the fixing members 520 moves down in the cam hole 511, so they can slide such that the fixing members 520 move closer to each other. Accordingly, when the wearer who was in the sitting position stands up, the fixing members 520 are naturally separated out of the through-holes 530, so the slider 230 can be released.

In contrast, when the cam assembly 510 is pressed down by the transmission link 430, the cam assembly 510 slides down with respect to the fixing members 520 and the slider 230. Further, as the cam assembly 510 moves down, the guide protrusions 521 of the fixing members 520 move up in the cam hole 511, so the guide protrusions 521 receives force that opens them to both sides. Accordingly, when the wearer is in the sitting position and the angle between the thigh link 100 and the crus link 200 becomes the sitting angle, the fixing members 520 can move away from each other to both sides and can be inserted in or pass through the through-holes 530.

Therefore, the slider 230 is released to be able slide even without operating, for example, pressing the fixing members 520 at both sides when the wearer stands up from the sitting angle. Further, the slider 230 is naturally fixed not to slide to the sitting angle when the wearer is in the sitting position.

Further, the wearable chair may further include a second elastic body that applies elasticity to the fixing members 520 such that the fixing members 520 at both sides move away from each other to both sides.

Although the present disclosure has been described and illustrated with reference to the particular embodiments thereof, it will be apparent to those skilled in the art that various improvements and modifications of the present disclosure can be made without departing from the technical idea of the present disclosure provided by the following claims.

What is claimed is:

1. A wearable chair, comprising:
   a thigh link extending in an extension direction of a wearer's thigh to be connected to the wearer's thigh;
   a crus link extending in an extension direction of the wearer's crus to be connected to the wearer's crus, having an upper end portion rotatably coupled to a lower end portion of the thigh link, and prevented from rotating such that an angle between the crus link and the thigh link is less than a sitting angle; and
   a contact link having a first end rotatably coupled to a lower end portion of the crus link and a second end coming in contact with a ground at a predetermined position from the crus link by rotating with respect to the first end with relative rotation between the thigh link and the crus link when the wearer is in a sitting position,
   wherein the crus link includes:
     a housing having an upper end portion rotatably coupled to the lower end portion of the thigh link and a lower end portion rotatably coupled to the contact link;
     a slider coupled to the housing to be able to slide in an extension direction of the housing;
     a rotary ring coupled to the lower end portion of the thigh link to be able to rotate to the thigh link, and connected to the slider to slide the slider by rotating;
     a stopper integrally combined with the rotary ring and locked to the lower end portion of the thigh link to rotate integrally with the rotary ring and the thigh link; and
     a retainer preventing sliding between the slider and the housing when the angle between the thigh link and the crus link is the sitting angle,
   wherein coupling steps protruding outward are formed on the lower end portion of the thigh link at a plurality of angular positions in a relative rotational direction to the crus link, and
   wherein the rotary ring is separably coupled to the stopper, the stopper is locked to the coupling steps to rotate integrally with the thigh link when the stopper is integrally combined with the rotary ring, and the sitting angle can be changed by relative rotation of the rotary ring to the thigh link according to the angular positions of the coupling steps to which the stopper is locked.

2. The wearable chair of claim 1, further comprising a crus holder coupled to the crus link in contact with the crus of the wearer so as to slide in the extension direction of the crus link.

3. The wearable chair of claim 2, wherein the lower end portion of the crus link comes in contact with the ground due to the crus link sliding down with respect to the crus holder when the wearer is in the sitting position.

4. The wearable chair of claim 1, further comprising:
   stopping steps formed at the upper end portion of the crus link and stopping relative rotation of the stopper to prevent relative rotation such that the angle between the thigh link and the crus link is less than the sitting angle.

5. The wearable chair of claim 1, wherein the retainer includes:
   though-holes formed through both sides of the housing surrounding both sides of the slider; and
   fixing members integrally moving in a sliding direction of the slider and disposed inside the slider to be able to slide to both sides of the slider, and when the fixing members slide to both sides of the slider and are inserted into the through-holes, sliding of the slider is stopped.

6. The wearable chair of claim 5, wherein the retainer further includes a cam assembly disposed over the slider and coupled to the slider to be able to slide in the sliding direction of the slider, and connected to perform a straight motion by a rotational portion of the rotary ring, and
   guide protrusions protruding in a direction perpendicular to a sliding direction of the fixing members are respectively formed on the fixing members, the cam assembly has a cam hole in which the guide protrusions of the fixing members are inserted and can vertically slide a predetermined distance, and the cam hole is formed such that the guide protrusions of the fixing members come close to each other when the guide protrusions slide down.

7. The wearable chair of claim 1, wherein the contact link rotates with relative rotation between the thigh link and the crus link in a rotational section where the angle between the thigh link and the crus link is between the sitting angle and a pressing angle obtained by adding a linkage angle to the sitting angle, and the contact link is fixed in a free section where the angle between the thigh link and the crus link is the pressing angle or more even though the thigh link and the crus link rotate to each other.

8. The wearable chair of claim 7, further comprising:
   an internal gear having inner teeth on the inner side, coupled to the rotary ring to freely rotate in the free section of the thigh link and the crus link, and locked to the rotary ring to integrally rotate in the rotational section of the thigh link and the crus link; and
   an external gear having outer teeth formed on the outer side to engage with the inner teeth of the internal gear and connected to the contact link to rotate with the contact link.

9. The wearable chair of claim 8, wherein the external gear is smaller in number of teeth than the internal gear, thereby accelerating rotation of the internal gear.

10. The wearable chair of claim 1, wherein the
    slider rotates the contact link by sliding with relative rotation between the thigh link and the crus link.

11. The wearable chair of claim 10, further comprising a transmission link having a first end connected to operate with relative rotation between the thigh link and the crus link and a second end connected to the slider, thereby converting a rotational motion according to relative rotation between the thigh link and the crus link into a straight motion of the slider.

12. The wearable chair of claim 10, wherein the first end of the contact link is rotatably coupled to a lower end portion of the housing, and
    the wearable chair further comprises a connection link having a first end portion rotatably coupled to the slider and a second end portion coupled at a predetermined distance from the first end of the contact link coupled to the lower end portion of the housing such that the slider rotates the contact link by sliding.

* * * * *